US012766718B2

(12) United States Patent
Nikovski et al.

(10) Patent No.: US 12,766,718 B2

(45) Date of Patent: Oct. 20, 2026

(54) SYSTEM AND METHOD SUITABLE FOR VISUAL SERVO CONTROL OF A ROBOT TO EXECUTE A TASK OF REACHING A TARGET STATE IN AN ENVIRONMENT

(71) Applicant: Mitsubishi Electric Research Laboratories, Inc., Cambridge, MA (US)

(72) Inventors: Daniel Nikolaev Nikovski, Brookline, MA (US); Jen-Wei Wang, Albany, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 72 days.

(21) Appl. No.: 19/050,180

(22) Filed: Feb. 11, 2025

(65) Prior Publication Data

US 2026/0233391 A1 Aug. 13, 2026

(51) Int. Cl.
*B25J 9/16* (2006.01)

(52) U.S. Cl.
CPC ............ *B25J 9/1661* (2013.01); *B25J 9/161* (2013.01); *B25J 9/163* (2013.01); *B25J 9/1697* (2013.01)

(58) Field of Classification Search
CPC . B25J 9/1661; B25J 9/161; B25J 9/163; B25J 9/1697
See application file for complete search history.

(56) References Cited

U.S. PATENT DOCUMENTS 8,879,822 B2 * 11/2014 Matsumoto ............ B25J 9/1697 382/153

2016/0243704 A1 * 8/2016 Vakanski ............... B25J 9/1664

OTHER PUBLICATIONS

Y. Qiu, B. Li, W. Shi and X. Zhang, "Visual Servo Tracking of Wheeled Mobile Robots With Unknown Extrinsic Parameters," in IEEE Transactions on Industrial Electronics, vol. 66, No. 11, pp. 8600-8609, Nov. 2019, doi: 10.1109/TIE.2019.2891407 (Year: 2019).*

Jian Chen, D. M. Dawson, W. E. Dixon and A. Behal, "Adaptive homography-based visual servo tracking for a fixed camera configuration with a camera-in-hand extension," in IEEE Transactions on Control Systems Technology, vol. 13, No. 5, pp. 814-825, Sep. 2005, doi: 10.1109/TCST.2005.852150. (Year: 2005).*

* cited by examiner

*Primary Examiner* — Khoi H Tran
*Assistant Examiner* — Trang Dang
(74) *Attorney, Agent, or Firm* — Gene Vinokur

(57) ABSTRACT

The present disclosure provides a system and a method for controlling a robot to execute a task of reaching a target state in an environment. The method includes receiving an image of the robot operating in the environment and receiving a target image including image coordinates corresponding to a first target key point and a second target key point on the robot. The method further includes determining a homography matrix based on at least four visible points in the received image that are coplanar to image coordinates of a first key point and a second key point, and reconstructing the image coordinates of the first key point and the second key point based on the homography matrix. The method further includes computing, based on the reconstructed image coordinates and a transition dynamics model of the robot, a control law that navigates the robot to the target state.

20 Claims, 14 Drawing Sheets

SYSTEM AND METHOD SUITABLE FOR VISUAL SERVO CONTROL OF A ROBOT TO EXECUTE A TASK OF REACHING A TARGET STATE IN AN ENVIRONMENT

TECHNICAL FIELD

The present disclosure relates generally to control systems, and more specifically to a system and a method suitable for visual servo control of a robot to execute a task of reaching a target state in an environment.

BACKGROUND

Robots are autonomous or semi-autonomous machines designed to perform tasks ranging from simple actions, such as picking up objects, to more complex operations, like assembling parts in a manufacturing line or performing medical procedures. To enable the robots to perform the tasks, the robots are controlled using various methods.

Visual servoing (VS) is an important class of robot control methods often used for performing a task of reaching a target state of the robot in an environment. The VS method can be used to track and control a state of the robot to reach the target state. The VS method uses a camera installed at a location in the environment to track the robot. The camera captures an image of the environment. The captured image includes an image of the robot. The state of the robot can be determined based on numerous visual features of the robot in the captured image. However, determining the state of the robot based on the numerous visual features is computationally complex and tedious due to high dimensionality of the numerous visual features, and is possible if the camera observing it is calibrated and its extrinsic (mapping from image space to world coordinates) is known.

Further, due to dynamic nature of the environment, consistent and uninterrupted visibility of the visual features of the robot is not guaranteed. For example, due to environmental factors like occlusions, changes in lighting, or visual noise, the visual features are not accurately captured by the camera. Additionally, the robot may be occluded by obstacles present in the environment, leading to loss of visibility of the robot and the visual features of the robot. Such a loss in the visual features disrupts stability of control systems that rely on the visual features for controlling the state of the robot.

Therefore, there is a need for an improved system and method for tracking and controlling the robot in dynamic environments.

SUMMARY

It is an objective of some embodiments to track and control a state of a robot in an environment based on key points on the robot. In particular, it is an object of some embodiments to track and control the state of the robot based on two key points on the robot. Additionally, it is an object of some embodiments to track and control the state of the robot when one or both of the two key points are occluded, by reconstructing the occluded key points. Additionally, it is an object of some embodiments to track and control the state of the robot, when one or both of the two key points are occluded and a camera tracking the robot is uncalibrated, by reconstructing the occluded key points.

The state of the robot includes one or more of a location and an orientation of the robot. The environment corresponds to a space of a warehouse, a space of a factory setup, or any space where the robot is desired to execute a task. The robot may be a mobile robot or a robotic manipulator. The robot is desired to execute the task in the environment. For example, the robot is a manipulator robot and the task of the robot includes one or a combination of pushing an object to a target location, stacking of objects, and aligning of the objects. In another example, the robot is the mobile robot and the task of the mobile robot is to lift and move the objects from one location to another location within an industrial or manufacturing unit, for transporting the objects.

For the purpose of explanation, the robot is considered to be the mobile robot and the task of the robot is to reach a target state from its current state by navigating on a floor in the environment. The target state, for example, includes a target location and a target orientation of the robot in the environment. To this end, it is an object of some embodiments to track and control the state of the robot to reach the target state.

Some embodiments are based on the recognition that visual servoing (VS) method can be used to track and control the state of the robot to reach the target state. The VS method uses a camera installed at a location in the environment. The camera is configured to capture an image of the environment. The captured image includes an image of the robot. The state of the robot can be determined based on numerous visual features of the robot in the captured image. However, determining the state of the robot based on the numerous visual features is computationally complex and tedious due to high dimensionality of the numerous visual features.

Some embodiments are based on the recognition that, to mitigate such a problem, the state of the robot can be determined by selecting two key points on the robot, if the robot is undergoing only planar motion. The two key points, being rigidly connected, are selected such that the two key points are sufficient to describe the robot's location and orientation. For instance, in an embodiment, one of the key points is defined to be a centroid of the robot and the other key point is defined to be a point on the robot at a predefined distance from the centroid of the robot. Further, image coordinates of the key points and in the captured image can be used to determine the state of the robot and subsequently control the state of the robot to reach the target state. Such a simplified representation of the robot's state using only two key points significantly reduces computational complexity and burden of the robot's state determination.

However, due to dynamic nature of the environment, consistent and uninterrupted visibility of the two key points is not guaranteed. For example, due to environmental factors like occlusions, changes in lighting, or visual noise, the two key points might not be visible for the camera. Additionally, the key points may be occluded by parts of the robot or obstacles present in the environment, leading to loss of visibility of the key points and. Such a loss in visibility of the two key points disrupts stability of control systems that rely on the image coordinates of the two key points for controlling the state of the robot.

Some embodiments are based on the realization that when one or both of the two key points are occluded, other points on the robot are visible to the camera and the visible points can be used to reconstruct the occluded key points. In particular, when one or both of the two key points are occluded, one or both of the image coordinates of the two key points become occluded in an image domain of the captured images. The occluded image coordinates are reconstructed by selecting at least four visible points coplanar to the image coordinates of the two key points in the image domain. The at least four visible points lie on a same plane on which the image coordinates of the key points lie in the image domain.

Further, a homography matrix is derived based on the at least four visible points. Based on the homography matrix, the image coordinates of the occluded key points are reconstructed. The at least four visible points that are coplanar to the image coordinates of the two key points maintain a geometric relationship. The geometric relationship is utilized by the homography matrix to reconstruct the image coordinates of the two key points. The reconstructed image coordinates are used to reconstruct the occluded key points. In such a manner, the two key points are continuously tracked in the image domain though the two key points are occluded.

Some embodiments are based on the further realization that the image coordinates of the two key points are reconstructed even when the two key points are directly measurable by the camera and are not occluded, because measuring the image coordinates of the two key points by the camera is subject to noise. The reconstructed image coordinates are consistent and more accurate than noisy measurements of the two key points.

Further, the reconstructed image coordinates of the two key points are used to control the state of robot to achieve the target state. For example, in an embodiment, a reference image is received. The reference image includes image coordinates corresponding to a first target key point and a second target key point on the robot. The image coordinates of the first target key point and the second target key point define the target state of the robot that includes the target location and the target orientation of the robot in the environment. Further, based on the reconstructed image coordinates and a transition dynamics model of the robot, a control law is computed. The control law navigates the robot from the reconstructed image coordinates to the image coordinates corresponding to the first target key point and the second target key point. The transition dynamics model is learned in advance (i.e., offline) and models dynamics of the robot with respect to the image coordinates of the two key points, in the image domain.

Further, the robot is controlled based on the control law to achieve the image coordinates corresponding to the first target key point and the second target key point to reach the target state of the robot. The control law includes a trajectory for navigating the robot to the target state. Based on the trajectory, control commands to one or more actuators of the robot are generated. The one or more actuators are controlled based on the control commands to change the state of the robot to the target state.

As the state of the robot is tracked by tracking the image coordinates of the two key points, the state tracking is performed in the image domain. Further, as the computed control law navigates the robot from the reconstructed image coordinates to the image coordinates corresponding to the first target key point and the second target key point, the robot is controlled in the image domain. Furthermore, the transition dynamics model that models the dynamics of the robot with respect to the image coordinates of the two key points is learned and modeled in the image domain. As the state tracking, motion planning and controlling are performed in the image domain, the robot is, therefore, in the image domain. Operating in the image domain eliminates transformation of image features into world coordinates, ensuring that a controller of the robot remains effective even under the dynamic nature of the environment or calibration inaccuracies of the camera. Further, operating in the image domain enhances the controller's robustness and reduces computational complexity. The reduced computational complexity allows the controller to operate at high speeds and adapt to complex environments. Furthermore, the controller avoids a need for camera calibration and external pose estimation, making the controller suitable for a wide range of applications, including healthcare robotics, autonomous vehicles, and industrial automation.

Accordingly, one embodiment discloses a controller for controlling a robot to execute a task of reaching a target state in an environment. The controller comprises a memory configured to store a transition dynamics model that models dynamics of the robot with respect to image coordinates of a first key point and a second key point on the robot, wherein the image coordinates of the first key point and the second key point on the robot define a state of the robot; and a processor configured to: receive, from a camera, an image of the robot operating in the environment; receive a target image including image coordinates corresponding to a first target key point and a second target key point on the robot, wherein the first target key point and the second target key point on the robot define the target state of the robot in the environment; determine a homography matrix based on at least four visible points in the received image that are coplanar to the image coordinates of the first key point and the second key point; reconstruct the image coordinates of the first key point and the second key point based on the homography matrix; compute, based on the reconstructed image coordinates and the transition dynamics model, a control law that navigates the robot from the reconstructed image coordinates to the image coordinates corresponding to the first target key point and the second target key point; and control the robot based on the control law to achieve the image coordinates corresponding to the first target key point and the second target key point to reach the target state of the robot.

Accordingly, another embodiment discloses a method for controlling a robot to execute a task of reaching a target state in an environment, the method uses a memory configured to store a transition dynamics model that models dynamics of the robot with respect to image coordinates of a first key point and a second key point on the robot, wherein the image coordinates of the first key point and the second key point on the robot define a state of the robot. The method comprises receiving, from a camera, an image of the robot operating in the environment; receiving a target image including image coordinates corresponding to a first target key point and a second target key point on the robot, wherein the first target key point and the second target key point on the robot define the target state of the robot in the environment; determining a homography matrix based on at least four visible points in the received image that are coplanar to the image coordinates of the first key point and the second key point; reconstructing the image coordinates of the first key point and the second key point based on the homography matrix; computing, based on the reconstructed image coordinates and the transition dynamics model, a control law that navigates the robot from the reconstructed image coordinates to the image coordinates corresponding to the first target key point and the second target key point; and controlling the robot based on the control law to achieve the image coordinates corresponding to the first target key point and the second target key point to reach the target state of the robot.

Accordingly, yet another embodiment discloses a non-transitory computer-readable storage medium embodied thereon a program executable by a processor for performing a method for controlling a robot to execute a task of reaching a target state in an environment, the storage medium stores a transition dynamics model that models dynamics of the robot with respect to image coordinates of a first key point and a second key point on the robot, wherein the image coordinates of the first key point and the second key point on the robot define a state of the robot. The method comprises receiving, from a camera, an image of the robot operating in the environment; receiving a target image including image coordinates corresponding to a first target key point and a second target key point on the robot, wherein the first target key point and the second target key point on the robot define the target state of the robot in the environment; determining a homography matrix based on at least four visible points in the received image that are coplanar to the image coordinates of the first key point and the second key point; reconstructing the image coordinates of the first key point and the second key point based on the homography matrix; computing, based on the reconstructed image coordinates and the transition dynamics model, a control law that navigates the robot from the reconstructed image coordinates to the image coordinates corresponding to the first target key point and the second target key point; and controlling the robot based on the control law to achieve the image coordinates corresponding to the first target key point and the second target key point to reach the target state of the robot.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
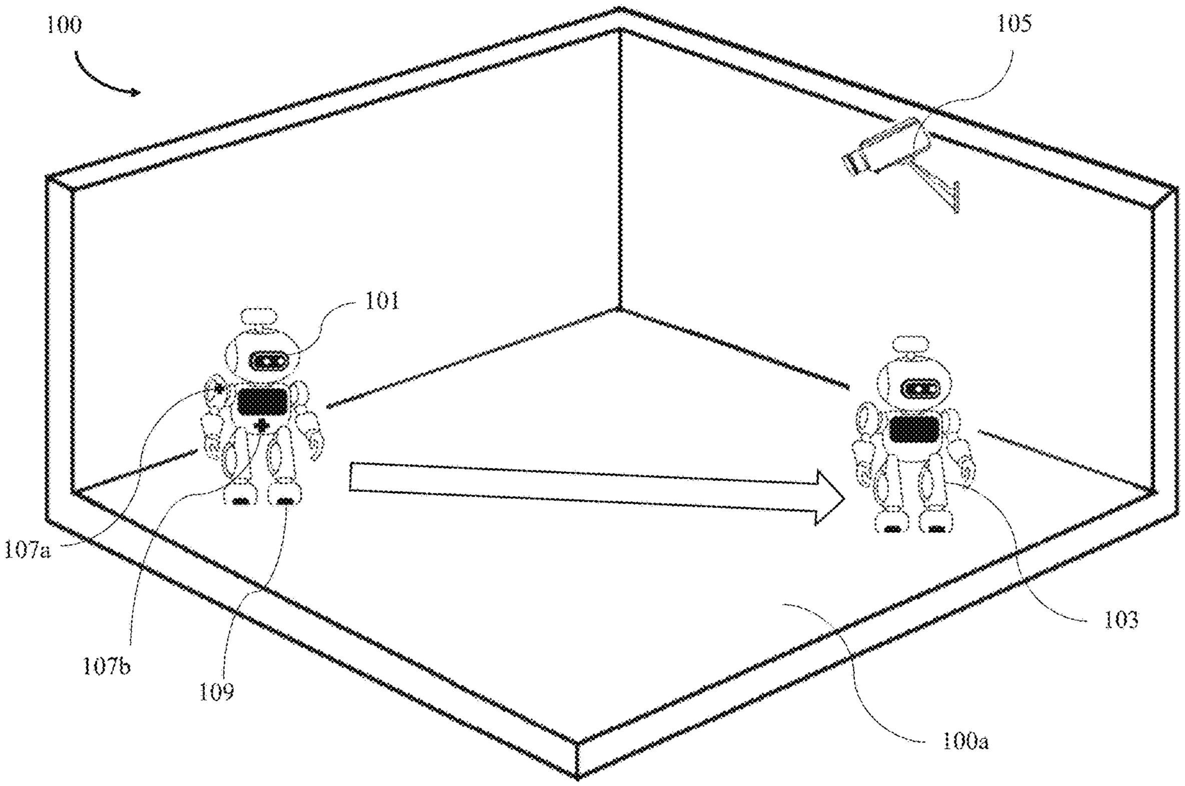
FIG. 1A illustrates tracking of a robot in an environment, according to an embodiment of the present disclosure.

FIG. 1A illustrates tracking of a robot 101 in an environment 100, according to an embodiment of the present disclosure. The environment 100 corresponds to a space of a warehouse, a space of a factory setup, or any space where the robot 101 is desired to execute a task. The robot 101 may be a mobile robot or a robotic manipulator. The robot 101 is desired to execute the task in the environment 100. For example, the robot 101 is a manipulator robot and the task of the robot 101 includes one or a combination of pushing an object to a target location, stacking of objects, and aligning of the objects. In another example, the robot 101 is the mobile robot and the task of the mobile robot is to lift and move the objects from one location to another location within an industrial or manufacturing unit, for transporting the objects.

For the purpose of explanation, the robot 101 is considered to be the mobile robot and the task of the robot 101 is to reach a target state 103 from its current state 109 by navigating on a floor 100*a* in the environment 100. The target state 103, for example, includes a target location and a target orientation of the robot 101 in the environment 100. To this end, it is an object of some embodiments to track and control a state of the robot 101 to reach the target state 103. The state of the robot 101, for example, includes a location and an orientation of the robot 101 in the environment 100.

Some embodiments are based on the recognition that visual servoing (VS) method can be used to track and control the state of the robot 101 to reach the target state 103. The VS method uses a camera 105 installed at a location in the environment 100. The camera 105 is configured to capture an image of the environment 100. The captured image includes an image of the robot 101. The state of the robot 101 can be determined based on numerous visual features of the robot 101 in the captured image. However, determining the state of the robot 101 based on the numerous visual features is computationally complex and tedious due to high dimensionality of the numerous visual features, and is only possible if the camera observing it is calibrated and its extrinsic (mapping from image space to world coordinates) is known.

Some embodiments are based on the recognition that, to mitigate such a problem, the state of the robot 101 can be determined uniquely, up to a constant perspective projection, by selecting two key points on the robot 101, e.g., key points 107*a* and 107*b*. The key points 107*a* and 107*b*, being rigidly connected, are selected such that the key points 107*a* and 107*b* are sufficient to describe the robot's location and orientation. For instance, in an embodiment, one of the key points 107*a* and 107*b* is defined to be a centroid of the robot 101 and the other key point is defined to be a point on the robot 101 at a predefined distance from the centroid of the robot 101. Further, image coordinates of the key points 107*a* and 107*b* in the captured image can be used to determine the state of the robot 101 and subsequently control the state of the robot 101 to reach the target state 103. Such a simplified representation of the robot's state using only two key points 107*a* and 107*b* significantly reduces computational complexity and burden of the robot's state determination.

However, due to dynamic nature of the environment 100, consistent and uninterrupted visibility of the key points 107*a* and 107*b* is not guaranteed. For example, due to environmental factors like occlusions, changes in lighting, or visual noise, the key points 107*a* and 107*b* might not be visible for the camera 105. Additionally, the key points 107*a* and 107*b* may be occluded by parts of the robot 101 or obstacles present in the environment 100, leading to loss of visibility of the key points 107*a* and 107*b*. Such a loss in visibility of the key points 107*a* and 107*b* disrupts stability of control systems that rely on the image coordinates of the key points 107*a* and 107*b* for controlling the state of the robot 101.

Some embodiments are based on the realization that when one or both of the key points 107*a* and 107*b* are occluded, other points on the robot 101 are visible to the uncalibrated camera 105 and the visible points can be used to reconstruct the occluded key points. In particular, when one or both of the key points 107*a* and 107*b* are occluded, one or both of the image coordinates of the key points 107*a* and 107*b* become occluded in an image domain of the captured images. The occluded image coordinates are reconstructed by selecting at least four visible points coplanar to the image coordinates of the key points 107*a* and 107*b* in the image domain. The at least four visible points lie on a same plane on which the image coordinates of the key points 107*a* and 107*b* lie in the image domain.

Further, a homography matrix is derived based on the at least four visible points. Based on the homography matrix, the image coordinates of the occluded key points are reconstructed. The reconstructed image coordinates are used to reconstruct the occluded key points. In such a manner, the key points 107*a* and 107*b* are continuously tracked in the image domain even though the key points are occluded and the camera 105 is uncalibrated.

Some embodiments are based on the further realization that the image coordinates of the key points 107*a* and 107*b* are reconstructed even when the key points 107*a* and 107*b* are directly measurable by the camera 105 and are not occluded, because measuring the image coordinates of the key points 107*a* and 107*b* by the camera 105 is subject to noise. The reconstructed image coordinates are consistent and more accurate than noisy measurements of the key points 107*a* and 107*b*.

Further, the reconstructed image coordinates of the key points 107*a* and 107*b* are used to control the state of robot 101 to achieve the target state 103.

Figure 1B:
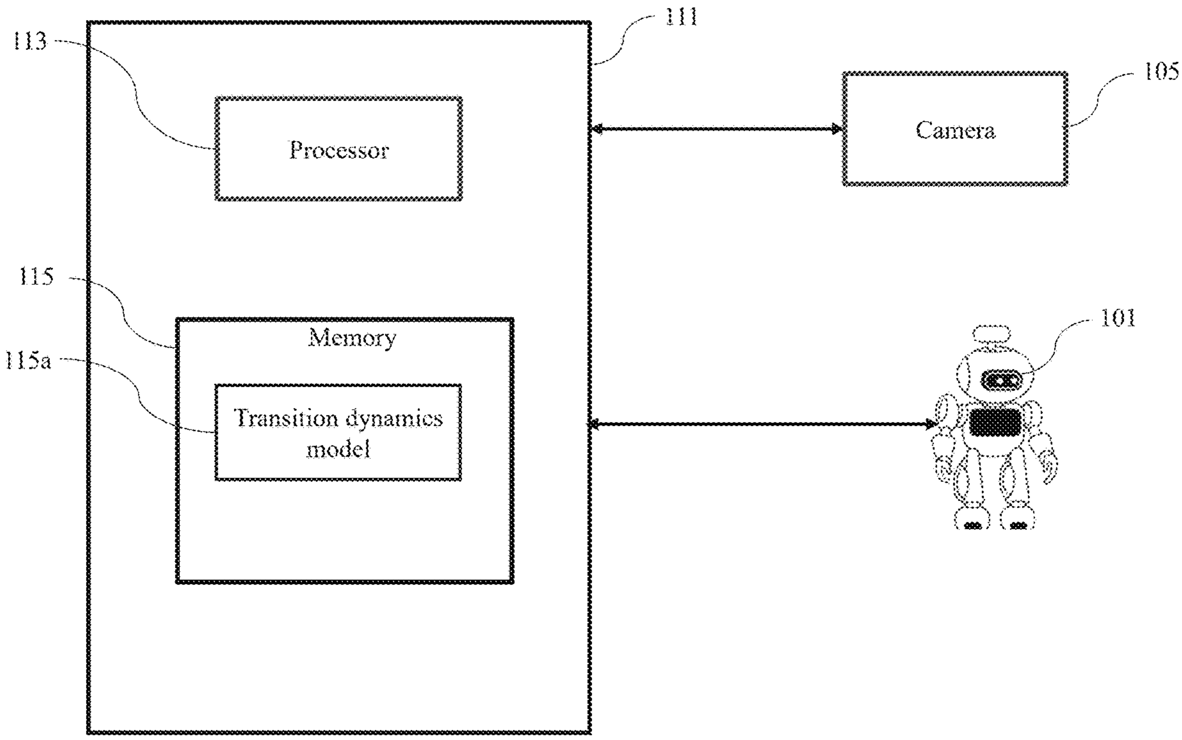
FIG. 1B illustrates a controller for controlling the robot to achieve a target state, according to some embodiments of the present disclosure.

FIG. 1B illustrates a controller 111 for controlling the robot 101 to achieve the target state 103, according to some embodiments of the present disclosure. The controller 111 is communicatively coupled to the camera 105 and the robot 101. In some embodiments, the controller 111 is integrated into the robot 101. The controller 111 is configured to control the robot 101 to execute the task. The controller 111 includes a processor 113 and a memory 115. The processor 113 may be a single core processor, a multi-core processor, a computing cluster, or any number of other configurations. The memory 115 may include random access memory (RAM), read only memory (ROM), flash memory, or any other suitable memory systems. Additionally, in some embodiments, the memory 115 may be implemented using a hard drive, an optical drive, a thumb drive, an array of drives, or any combinations thereof.

Further, the memory 115 includes a transition dynamics model of the robot 115*a*. The processor 113 is configured to execute the transition dynamics model 115*a* to execute the task. The transition dynamics model 115*a* is learned in advance (i.e., offline) to model dynamics of the robot 101 with respect to the image coordinates of the key points 107*a* and 107*b* in the image domain. Hereinafter, the key point 107*a* is referred to as a 'first key point 107*a*' and the key point 107*b* is referred to as a 'second key point 107*b*'. The image coordinates of the first key point 107*a* and the second key point 107*b* define the state of the robot 101. The state of the robot 101 includes the location and the orientation of the robot 101.

Figure 1C:
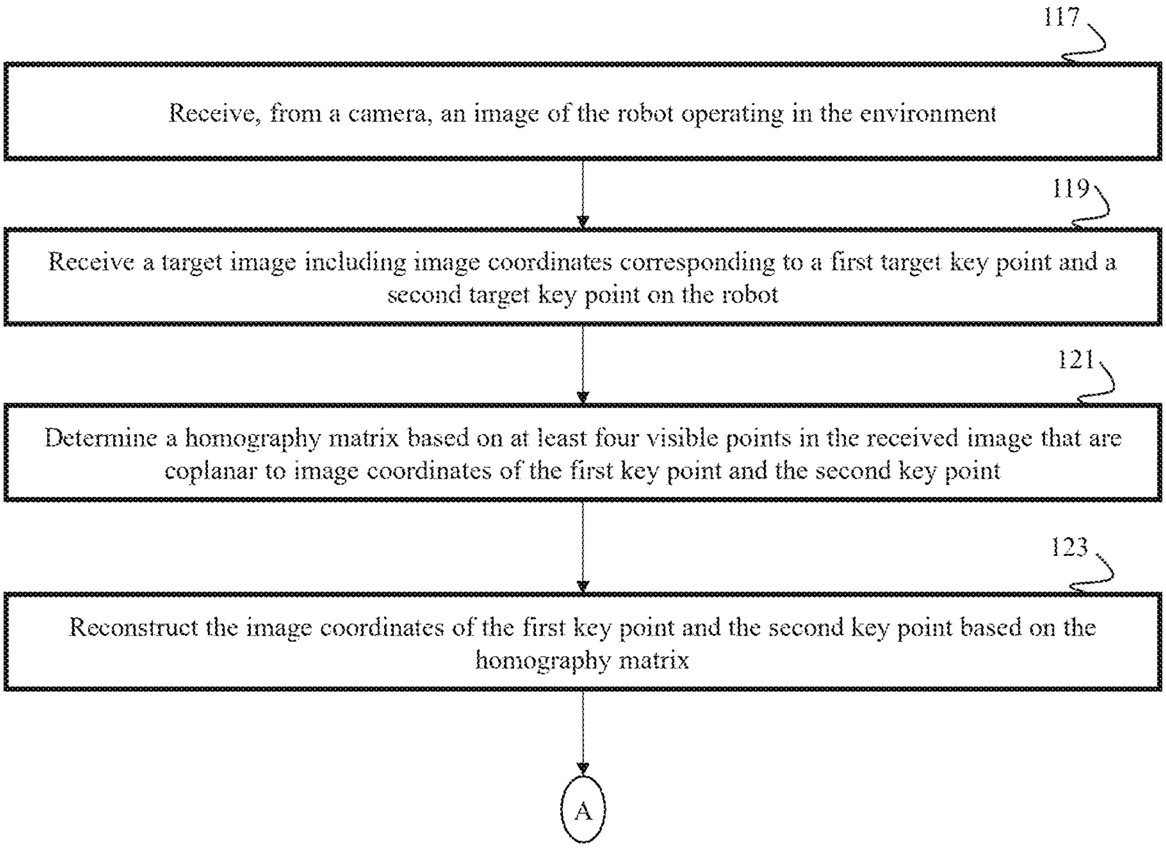
FIG. 1C illustrates functions executed by the controller for controlling the robot to reach the target state, according to some embodiments of the present disclosure.
Figure 1C:
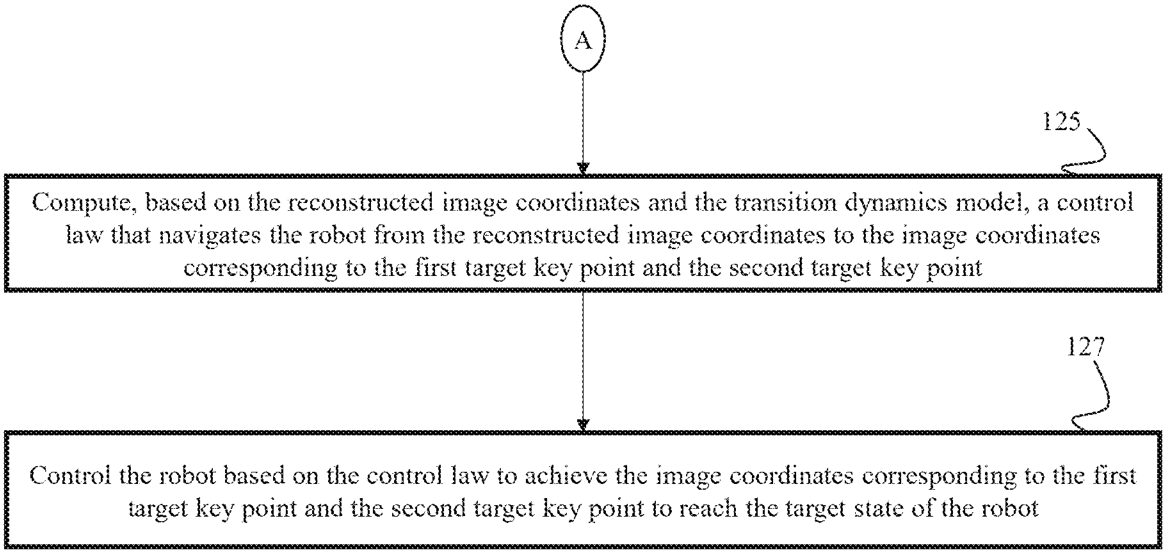

FIG. 1C illustrates functions executed by the controller 111 for controlling the robot 101 to execute the task of reaching the target state 103, according to some embodiments of the present disclosure. At block 117, the processor 113 is configured to receive, from the camera 105, an image of the robot 101 operating in the environment 100.

At block 119, the processor 113 is configured to receive a reference image including image coordinates corresponding to a first target key point and a second target key point on the robot 101.

Figure 1D:
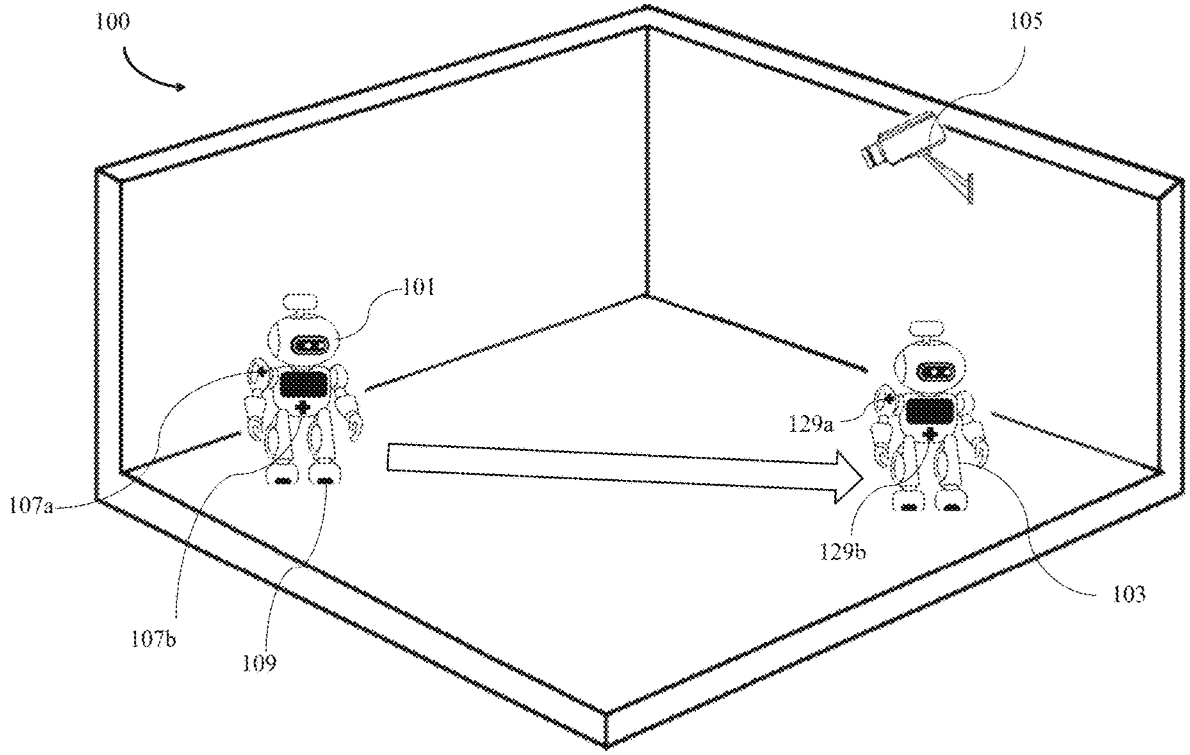
FIG. 1D illustrates a first target key point and a second target point on the robot, according to some embodiments of the present disclosure.

FIG. 1D illustrates a first target key point 129*a* and a second target point 129*b* on the robot 101, according to some embodiments of the present disclosure. The reference image includes image coordinates of the first target key point 129*a* and the second target key point 129*b*. The image coordinates of the first target key point 129*a* and the second target key point 129*b* define the target state 103 of the robot 101 that includes the target location and the target orientation of the robot 101 in the environment 100.

Referring back to FIG. 1C, at block 121, the processor 113 is configured to determine a homography matrix based on at least four visible points in the received and goal images that are coplanar to the image coordinates of the first key point 107*a* and the second key point 107*b*. At block 123, the processor 113 is configured to reconstruct the image coordinates of the first key point 107*a* and the second key point 107*b* based on the homography matrix. The at least four visible points in the received image that are coplanar to the image coordinates of the first key point 107*a* and the second key point 107*b* maintain a geometric relationship. The geometric relationship is utilized by the homography matrix to reconstruct the image coordinates of the first key point 107*a* and the second key point 107*b*

At block 125, the processor 113 is configured to compute, based on the reconstructed image coordinates and the transition dynamics model 115*a*, a control law that navigates the robot 101 from the reconstructed image coordinates to the image coordinates corresponding to the first target key point 129*a* and the second target key point 129*b*.

At block 127, the processor 113 is configured to control the robot 101 based on the control law to achieve the image coordinates corresponding to the first target key point 129*a* and the second target key point 129*b* to reach the target state of the robot. The control law includes a trajectory for navigating the robot 101 to the target state 103. The processor 113 is configured to generate control commands to one or more actuators of the robot 101, based on the trajectory. Further, the processor 113 is configured to control the one or more actuators based on the control commands to change the state of the robot 101 to the target state 103.

As the state of the robot 101 is tracked by tracking the image coordinates of the key points, the state tracking is performed in the image domain. Further, as the computed control law navigates the robot 101 from the reconstructed image coordinates to the image coordinates corresponding to the first target key point 129*a* and the second target key point 129*b*, the robot 101 is controlled in the image domain. Furthermore, the transition dynamics model 115*a* that models the dynamics of the robot 101 with respect to the image coordinates of the key points 107*a* and 107*b*, is learned and modeled in the image domain. As the state tracking, motion planning and controlling are performed in the image domain, the controller 111, therefore, operates in the image domain. Operating in the image domain eliminates transformation of image features into world coordinates, ensuring that the controller 111 remains effective even under the dynamic nature of the environment 100 or calibration inaccuracies of the camera 105. Further, operating in the image domain enhances the controller's robustness and reduces computational complexity. The reduced computational complexity allows the controller 111 to operate at high speeds and adapt to complex environments. Furthermore, the controller 111 avoids a need for camera calibration and external pose estimation, making the controller 111 suitable for a wide range of applications, including healthcare robotics, autonomous vehicles, and industrial automation.

In some embodiments, the homography matrix is computed using an outlier rejection algorithm, such as Random Sample Consensus (RANSAC). The RANSAC is an iterative algorithm used for robust parameter estimation when dealing with datasets that includes a large proportion of outliers. It is widely employed for fitting models such as lines, planes, or more complex shapes to data that is noisy or includes outlying points. The RANSAC algorithm includes selecting a random subset of data points, fitting a model to the selected data points, and classifying all the other data points as inliers or outliers based on how well they fit the model. This process is repeated for a specified number of iterations or until some stopping condition is met, with each iteration potentially producing a different model. The model that results in the highest number of inliers across all iterations is chosen as a final model. The RANSAC is non-parametric, meaning it does not make assumptions about the underlying distribution of the data, which makes it highly flexible and applicable to a wide range of problems. For example, the RANSAC algorithm can be used for line fitting in 2D and homography matrix estimation in image processing.

Some embodiments are based on the realization that a sequential feedback controller is derived based on the dynamics of the robot 101 modeled/learned with respect to the image coordinates of the first key point 107*a* and the second key point by the transition dynamics model 115*a*. Further, the sequential feedback controller computes the control law for navigating the robot 101 to the target state 103, as described below in FIG. 2.

Figure 2A:
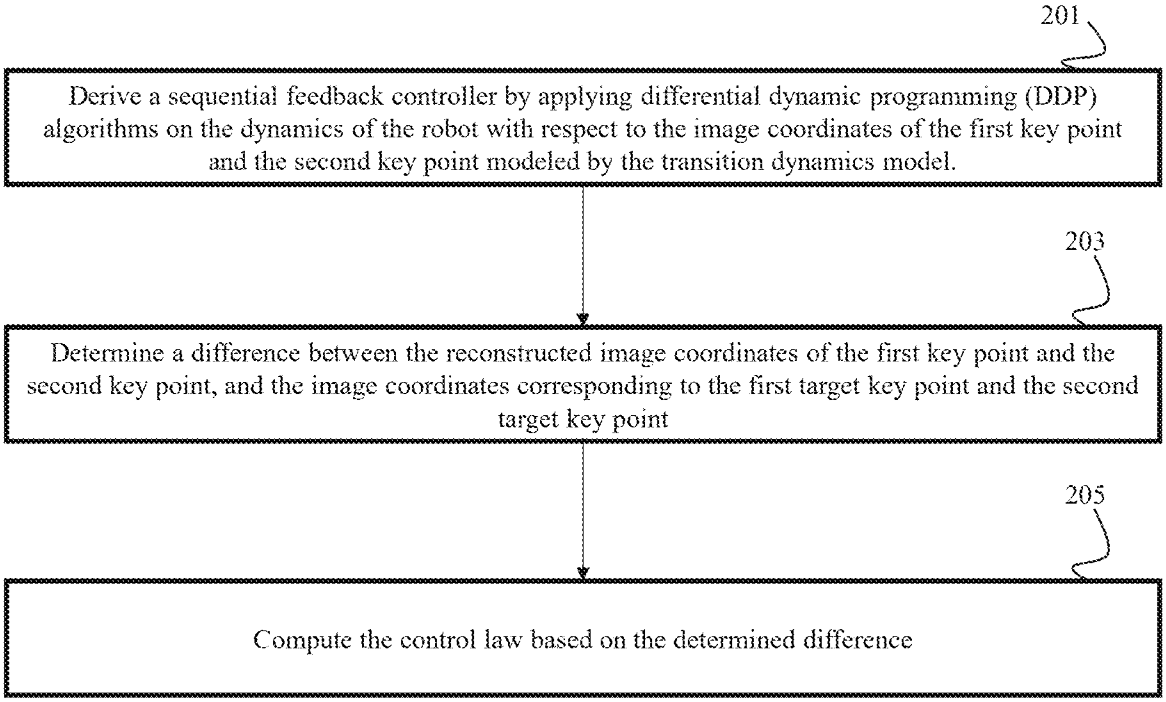
FIG. 2A illustrates computation of a control law, according to some embodiments of the present disclosure.

FIG. 2A illustrates computation of the control law, according to some embodiments of the present disclosure. At block 201, the processor 113 is configured to derive the sequential feedback controller by applying a differential dynamic programming (DDP) algorithm on the dynamics of the robot 101 with respect to the image coordinates of the first key point 107*a* and the second key point 107*b* modeled by the transition dynamics model 115*a*.

The DDP algorithm is an advanced optimization technique used for solving nonlinear optimal control problems. Unlike classical dynamic programming, which struggles with high-dimensional nonlinear systems due to its exhaustive state-space discretization, the DDP algorithm offers a more efficient approach by leveraging local linearization and quadratic approximations to solve the optimal control problem iteratively. An objective of the DDP algorithm is to minimize a cost function over a trajectory, where a cost typically includes a stage cost (e.g., energy or time) and a terminal cost (e.g., deviation from the target state).

At each iteration of the DDP algorithm, the DDP algorithm approximates the dynamics of the robot 101 and the cost function using linear and quadratic forms, respectively. This approximation is performed by linearizing the robot's dynamics around a current trajectory and approximating the cost function with a first-order Taylor expansion. A backward pass is then used to compute a sequence of control inputs by solving a local Riccati equation at each time step, resulting in feedback gains and value functions that define how to modify control inputs to improve an overall cost. Further, in forward pass, the current trajectory (including the control inputs) is updated using the feedback gains computed in the backward pass. This involves simulating the robot 101 forward with new control values and observing how the current trajectory improves.

The DDP algorithm proceeds with alternating backward and forward passes, gradually improving the trajectory by refining a cost-to-go function and minimizing the overall cost. The DDP algorithm is advantageous because it avoids the high computational cost of discretizing the entire state and control spaces, as in the dynamic programming, and instead works on approximating the optimal control problem locally at each step. The result is a locally optimal solution that is efficient to compute and well-suited for real-time applications.

At block 203, the processor 113 is configured to determine a difference between the reconstructed image coordinates of the first key point 107*a* and the second key point 107*b*, and the image coordinates corresponding to the first target key point 129*a* and the second target key point 129*b*. The determined difference is input to the sequential feedback controller.

At block 205, the sequential feedback controller is configured to compute the control law based on the inputted determined difference input.

Figure 2B:
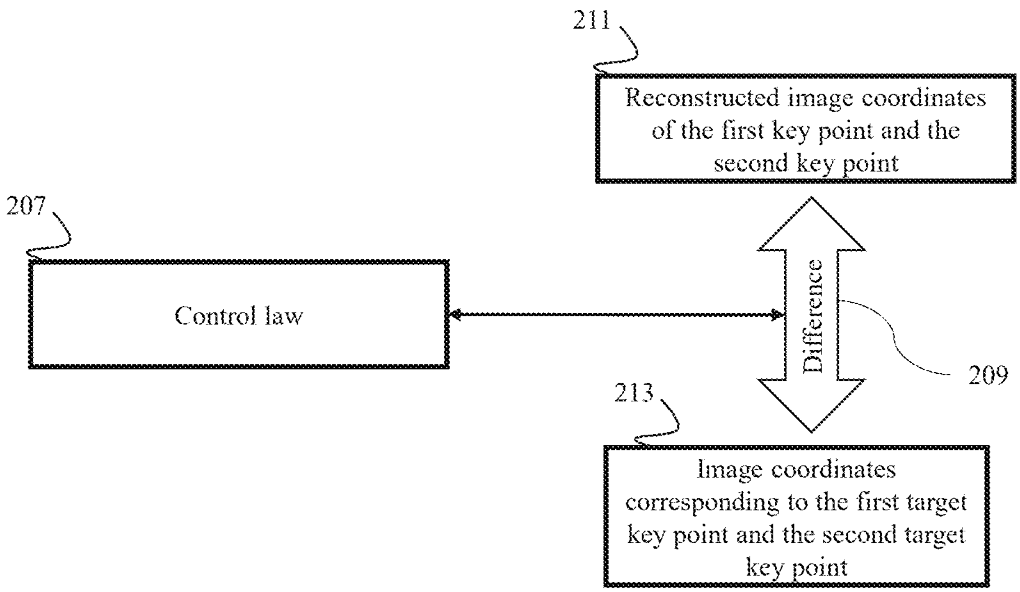
FIG. 2B illustrates the computation of the control law by a sequential feedback controller, according to some embodiments of the present disclosure.

FIG. 2B illustrates the computation of the control law by the sequential feedback controller, according to some embodiments of the present disclosure. In some embodiments, the processor 113 is configured to compute a control law 207 as a proportional feedback law based on a difference 209 between reconstructed image coordinates 211 of the first key point 107*a* and the second key point 107*b*, and image coordinates 213 corresponding to the first target key point 129*a* and the second target key point 129*b*. Further, the processor 113 controls the robot 101 according the control law 219 to achieve the image coordinates 213 corresponding to the first target key point 129*a* and the second target key point 129*b* to reach the target state 103.

In some embodiments, motion of the robot 101 is subject to a nonholonomic constraint. The nonholonomic constraint represents the robot's inability to move in a direction perpendicular to its current heading.

Figure 3:
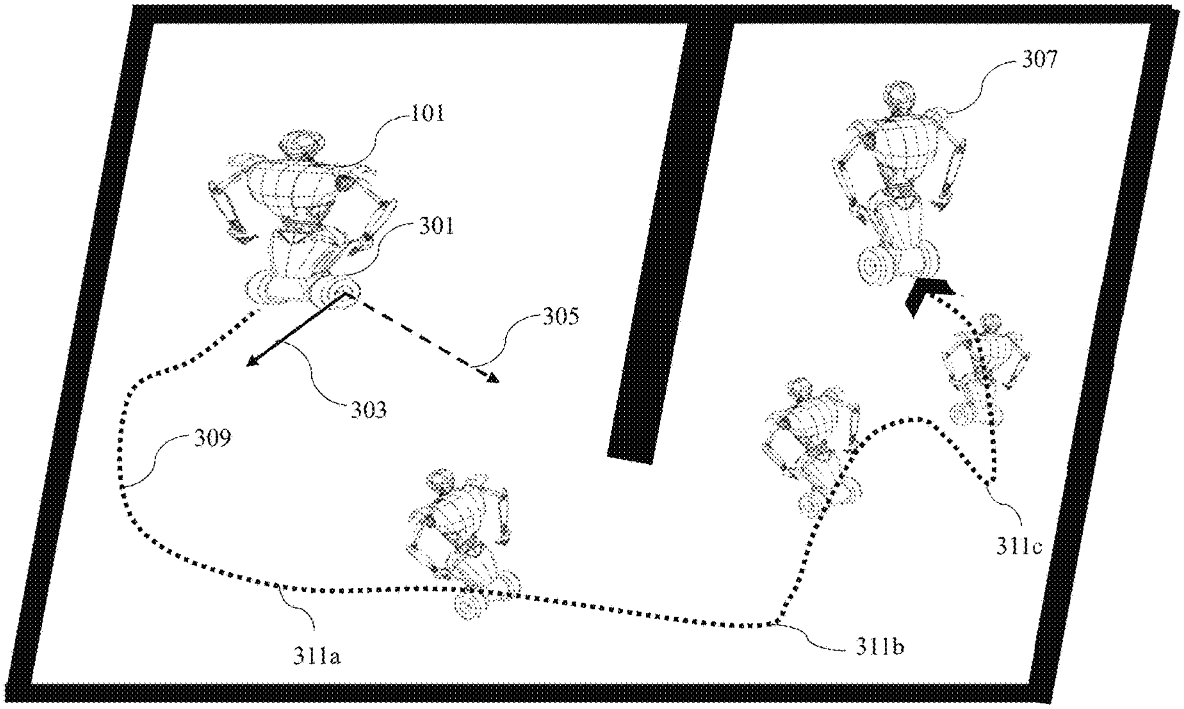
FIG. 3 illustrates the robot subject to a nonholonomic constraint, according to some embodiments of the present disclosure.

FIG. 3 illustrates the robot 101 subject to the nonholonomic constraint, according to some embodiments of the present disclosure. For instance, the robot 101 is a wheeled mobile robot including wheels 301. The wheels 301 are pointing in a direction 303. The wheeled mobile robot 101 is subject to a nonholonomic constraint that restricts movement of the wheeled mobile robot 301 in a direction 305 perpendicular to the direction 303 in which the wheels 301 are pointing in.

Some embodiments are based on the recognition that a feedback controller fails to control and bring such a robot subject to the nonholonomic constraint, to a target state 103, due to general inability of the feedback controller to stabilize systems (i.e., the robot) with the nonholonomic constraint. Therefore, there is a need for a formulation of control problem for controlling the robot 101 subject to the nonholonomic constraint.

Some embodiments are based on the realization that the control problem can be formulated as a planning problem solving which, by the processor 113, yields a complicated trajectory 309 for reaching the target state 307 of the robot 101. Traversing the complicated trajectory 309 temporarily increases a feedback error before bringing the feedback error to zero at the target state 307. For instance, the feedback error is temporarily increased at points 311*a*, 311*b*, and 311*c* on the trajectory 309 where the location of the robot 101 will be far from a target location included in the target state 307 and eventually the feedback error becomes zero at the target state 307. In an embodiment, the feedback error corresponds to the difference 209 between the reconstructed image coordinates 211 of the first key point 107*a* and the second key point 107*b*, and the image coordinates 213 corresponding to the first target key point 129*a* and the second target key point 129*b*.

The formulation of the planning problem for the robot 101 subject to the nonholonomic constraints is mathematically described below.

Problem Definition

For the purpose of explanation, the present disclosure considers the VS control of the robot 101 undergoing planar motion whose configuration $q \in C$ is described by the vector $q=(x, y, \theta)$ in an inertial frame, where configuration space C coincides with $\mathbb{R}^2 \times S^1$. An example of such a robot is a unicycle robot whose kinematic model is expressed as $$\dot{x} = v\cos\theta \tag{1}$$

$$\dot{y} = v\sin\theta \tag{2}$$

$$\dot{\theta} = \omega \tag{3}$$

The robot 101 is steered by control inputs $u=[v, \omega]$ representing its commanded linear and angular velocities, and is subject to a nonholonomic constraint $\dot{x} \sin \theta - \dot{y} \cos \theta = 0$. This model presupposes an existence of a fast low-level velocity controller that makes the robot 101 assume its commanded velocity (almost) instantaneously. The nonholonomic constraint represents the robot's inability to move in a direction perpendicular to its current heading.

The robot 101 is observed by the camera 105 at a fixed position in the inertial frame, such that its image plane is generally not parallel to xy plane in which the robot 101 moves. Intrinsic and extrinsic parameters of the camera 105 are unknown, so a correspondence between a point in the image plane and one in the robot's plane of motion cannot be established. However, it is assumed that at all control times $t_k$, a vector of m visual features $s[k] \in \mathbb{R}^m$ related and uniquely determining the robot's state is available. In other words, the image coordinates of the key points on the robot 101 are available. An example of such measurements is a stacked vector of image coordinates $(x_{c,i}, y_{c,i})$, $1 \le i \le c$ of $c \ge 2$ fixed points on the robot 101, resulting in m=2c. Another example is the state of the robot 101 in the image plane obtained by means of a registration algorithm based on matching templates, lines, edges, corners, or other visual elements, such as PatMax algorithm.

An objective of visual servoing is to bring the features s[k] to some desired target state s* described directly in the feature space by manipulating control variable u[k] at discrete times $t_k$. If the feature vector s[k] uniquely determines the robot's configuration q[k] at that time, this is equivalent to steering the robot 101 to the target state.

Proposed Method for Visual Servoing for the Robot with the Nonholonomic Constraints To determine the robot's configuration q[k] at time k, c is set to be 2 for the robot 101, resulting in m=4 entries of visual features. A residual dynamics function on a feature space (visual features space) can be expressed as $$\Delta[k] = f(s[k], u[k]) \tag{4}$$

where $\Delta[k]$ is a residual vector defined as $s[k+1]-s[k]$ and $f$ is unknown, $f$ is a nonlinear residual dynamics function describing how the robot 101 moves in the feature space in response to a given control command u[k]. Because the camera 105 is uncalibrated and $f$ is unknown, robot exploration data and machine learning algorithms are used to approximate $f$ (described in detail below in FIG. 4).

Some embodiments are based on the recognition that a feedback VS controller (e.g., controller 111) is of a form $u[k]=-Ke[k]$ with feedback gain $K=\lambda L[k]^+$, where $L[k]^+$ denotes a pseudo inverse of an interaction matrix L[k]. The interaction matrix is a Jacobian matrix measuring a ratio between output changes and control input changes, which can be derived from the residual dynamics function $f$. Since state dimension is 4 for the unicycle robot and the control dimension is 2, the interaction matrix is a 4×2 matrix expressed as $$L[k] = \begin{bmatrix} (x'_{C,1}-x_{C,1})/v & (x'_{C,1}-x_{C,1})/\omega \\ (y'_{C,1}-y_{C,1})/v & (y'_{C,1}-y_{C,1})/\omega \\ (x'_{C,2}-x_{C,2})/v & (x'_{C,2}-x_{C,2})/\omega \\ (y'_{C,2}-y_{C,2})/v & (y'_{C,2}-y_{C,2})/\omega \end{bmatrix} \tag{5}$$

where x' and y' denote next x and y coordinate of the image coordinates after control inputs/commands $(v, \omega)$ are applied.

The feedback VS controller regards the target state s* of the robot 101 as a set-point and aims to gradually reduce the feedback error to reach the target state. However, in target-reaching tasks on a nonholonomic system, this formulation fails to bring the robot 101 to the target state, due to the general inability of feedback controllers to stabilize systems with nonholonomic constraints. Therefore, the control problem is formulated as the planning problem, where reaching the target state traverses a complicated trajectory that might temporarily increase the feedback error before bringing it to zero.

A desired optimality of the computed control law is expressed by means of a cumulative cost $J_0$ that is a sum of running costs l and a final cost $l_f$, where the summation is computed over a sequence of control steps:

$$J_0(s_0,) = \sum_{k=0}^{H-1} l(s[k], [k]) + l_f(s[H]) \tag{6}$$

where the states s[k], k>0 follow dynamics defined above starting from $s[0]=s_0$, and ={[0], [1], . . . , [H−1]} is a sequence of control commands applied over a finite horizon of length H time steps. Here, a finite horizon is needed to avoid infinite cumulative costs. By providing suitable positive running costs l, desired minimum-time objectives can be achieved. A problem of trajectory optimization includes finding an optimal sequence of control commands $U^*=\text{argmin}_U J_0(s_0, U)$ from a specific starting state $s_0$, and not from every state within a state space of the robot 101.

The DDP and iterative linear quadratic regulator (iLQR) algorithms solve this trajectory optimization problem efficiently when the dynamics and stage costs l are differentiable. These algorithms (DDP an iLQR) includes computing a state trajectory by rolling out the dynamics forward, and then employing Bellman's principle of optimality to compute a sequence of optimal control commands and partial costs-to-go starting from the target state and proceeding backwards in time. Such forward and backward passes are iterated until convergence. The sequence of optimal control commands is expressed as $$u*[k] = K_{ilqr}[k]s[k] + k_{ilqr}[k] \tag{7}$$

where $K_{ilqr}$ is a closed-loop control gain and $k_{ilqr}$ is a open-loop control gain.

Training of the Transition Dynamics Model

The transition dynamins model 115*a* is trained offline to learn dynamics of the robot 100 with respect to the image coordinates of the first key point 107*a* and the second key point on the robot 107*b*.

Figure 4:
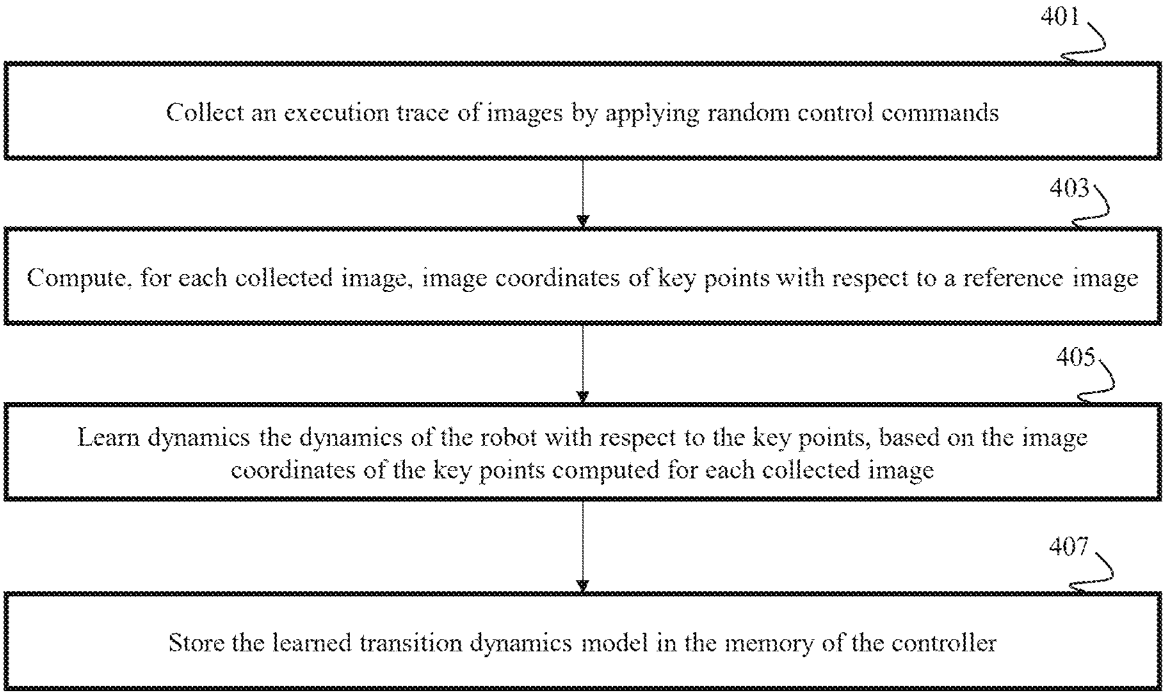
FIG. 4 illustrates training of a transition dynamins model of the robot, according to some embodiments of the present disclosure.

FIG. 4 illustrates training of the transition dynamins model 115*a*, according to some embodiments of the present disclosure. At block 401, random control commands are applied to the robot 101 and execution trace of images of the robot 101 are collected. The collected images are used as training images for training the transition dynamics model 115*a*.

At block 403, for each collected image, image coordinates of key points (e.g., key points 107*a* and 107*b*) are computed with respect to a reference image. The reference image corresponds a target image including image coordinates corresponding to target key points that define a target state of the robot 101. The target key points, for example, may be the first target key point 129*a* and the second target key point 129*b* on the robot 101.

At block 405, the transition dynamins model learns the dynamics of the robot 101 with respect to the key points 107*a* and 107*b*, based on the image coordinates of the key points computed for each collected image. Various machine learning methods, for example, Gaussian process regression or deep neural networks are used to learn the dynamics of the robot 101 with respect to the key points 107*a* and 107*b*, based on the image coordinates of the key points computed for each collected image.

Further, in some embodiments, at block 407, the learned transition dynamics model is stored in the memory 115 of the controller 111.

The learning of the dynamics of the robot 101 is mathematically described below.

Some embodiments are based on an assumption that translation and rotation parts of the robot's dynamics are independent from each other and the dynamics function $f$ can be decomposed into two parts. Thus, the vector s[k] at time k is redefined as $[x_{C,c}, y_{C,c}, dx_C, dy_C]$, where $(x_{C,c}, y_{C,c})$ is the centroid of the robot 101 coinciding with a first representative point $(x_{C,1}, y_{C,1})$, and $(dx_C, dy_C)$ is a vector pointing from the first point to a second point such that $(dx_C, dy_C)=(x_{C,2}-x_{C,1}, y_{C,2}-y_{C,1})$. Decomposed incremental dynamics function $f_{dec}$ can be expressed as $$\Delta_x[k] = f_{tr,x}(dx_C[k], dy_C[k], v[k]) \tag{8}$$

$$\Delta_y[k] = f_{tr,y}(dx_C[k], dy_C[k], v[k]) \tag{9}$$

$$\Delta_{dx}[k] = f_{rot,x}(dx_C[k], dy_C[k], \omega[k]) \tag{10}$$

$$\Delta_{dy}[k] = f_{rot,y}(dx_C[k], dy_C[k], \omega[k]) \tag{11}$$

where Δ denotes an increment of the state. Therefore, $\Delta_x[k]=x_{C,c}[k+1]-x_{C,c}[k]$, $\Delta_y[k]=y_{C,c}[k+1]-y_{C,c}[k]$, $\Delta_{dx}[k]=dx_C[k+1]-dx_C[k]$ and $\Delta_{dy}[k]=dy_C[k+1]-dy_C[k]$.

A goal of learning $f$ becomes that of learning $f_{tr,x}$, $f_{tr,y}$, $f_{rot,x}$ and $f_{rot,y}$, which forms the decomposed incremental dynamics $f_{dec}$. Note that $\Delta_x[k]$ and $\Delta_y[k]$ are in general dependent on $x_{C,c}$ and $y_{C,c}$, too.

In a real-world environment, the robot 101 will generally not reach a commanded velocity within one control step. Instead, an internal velocity controller accelerates or decelerates the robot 101 until it reaches the commanded velocity, which usually takes more than one control step. Therefore, approximated translation dynamics $f_{dec}$ of the robot 101 should be corrected to reflect that. Since a design of the internal velocity controller is unknown, a velocity measurement is added as an independent variable to improve the translation dynamics. Therefore, Equations 6 and 7 become $$\Delta_x[k] = f_{tr,x}(dx_C[k], dy_C[k], \dot{x}_{C,c}, \dot{y}_{C,c}, v[k]) \tag{8}$$

$$\Delta_y[k] = f_{tr,y}(dx_C[k], dy_C[k], \dot{x}_{C,c}, \dot{y}_{C,c}, v[k]) \tag{9}$$

where $(\dot{x}_{C,c}, \dot{y}_{C,c})$ is a velocity of the centroid. Since the control command is applied every few frames of the camera 105, the centroid's velocity is estimated by retrieving another centroid position one frame acquisition step before the control command, ensuring that the velocity estimate is up-to-date. Therefore, the centroid velocity can be estimated via a centroid difference multiplied by the frame rate of the camera 105.

Since the dynamics function is decomposed into the translation and the rotation part, translation data and rotation data are collected separately for learning ($f_{tr,x}$, $f_{tr,y}$) and ($f_{rot,x}$, $f_{rot,y}$) respectively. To collect the translation data, the robot 100 is placed at a starting position in an environment and commanded with a fixed v for a number of control steps (e.g, 20). Then, the robot 101 is commanded to turn 180 degrees and roll for a number of control steps with the same v to get back to the starting position. This completes two trajectories, and multiple such trajectories with different headings and different values of v are collected. To collect rotation data, the robot 101 is commanded with a fixed ω for a number of turns (e,g., 3). Again, value of ω is changed with different starting headings to complete the collection of the rotation data.

Using the collected rotation data and the translation data as training data, the dynamics function $f$ representing the transition dynamics model 115*a* of the robot 101 is learned using one or more of Locally Weighted Regression (LWR), Gaussian Process Regression (GPR), and Gaussian Mixture Models.

In an embodiment, the robot 101 is a warehouse mobile robot configured to execute a transportation task in a warehouse environment. The controller 111 is configured to control the warehouse mobile robot to execute the transport task, as described below in FIG. 5.

Figure 5:
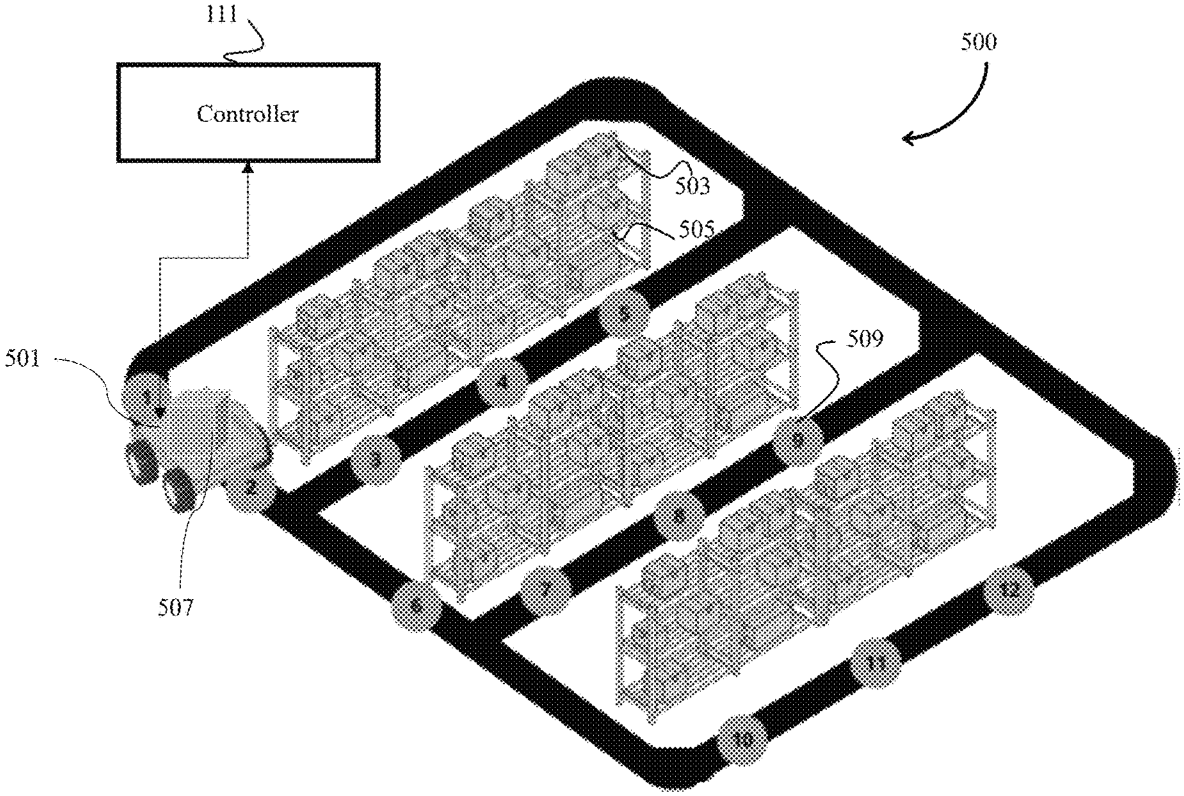
FIG. 5 illustrates controlling of a warehouse mobile robot in a warehouse, according to some embodiments of the present disclosure.

FIG. 5 illustrates controlling of a warehouse mobile robot 501 in a warehouse 500, according to some embodiments of the present disclosure. In the warehouse 500, objects 503 are arranged in a rack 505. The warehouse mobile robot 501 is a wheeled mobile robot. In some embodiments, the warehouse mobile robot 501 may be a legged mobile robot. The warehouse mobile robot 501 is communicatively coupled to the controller 111.

The warehouse mobile robot 501 has configured different objects to different locations 1-12 in the warehouse 500. For example, the warehouse mobile robot 501 is desired to execute a task of transporting an object 507 to a target location 509. The controller 111 controls the warehouse mobile robot 501 to navigate the warehouse mobile robot 501 to the target location 509. At first, the controller 111 receives an image of the warehouse mobile robot 501 operating in the warehouse 500, from a camera (not shown in figure) installed in the warehouse 500. Further, the controller 111 receives a target image including image coordinates corresponding to a first target key point and a second target key point on the warehouse mobile robot 501. The first target key point and the second target key point on the warehouse mobile robot 501 define the target location 509. Based on the received image and the target image, the controller 111 computes the image coordinates of the key points on the warehouse mobile robot 501 and subsequently a control law for the warehouse mobile robot 501, as described above with reference FIG. 1C.

Further, the controller 111 controls the warehouse mobile robot 501 according to the control law to navigate the warehouse mobile robot 501 to the target location 509. Thereby, transporting the object 507 to the target location 509 by the warehouse mobile robot 501. In such a manner, the controller 111 controls the warehouse mobile robot 501 to execute the task of transporting the object 507 to the target location 509.

In another embodiment, the robot 101 is an autonomous vehicle and the autonomous vehicle is desired to execute a task of reaching a target parking spot in a parking space. The controller 111 controls the autonomous vehicle to execute the task of reaching the target parking spot in the parking space, as described below in FIGS. 6A-6C.

Figure 6A:
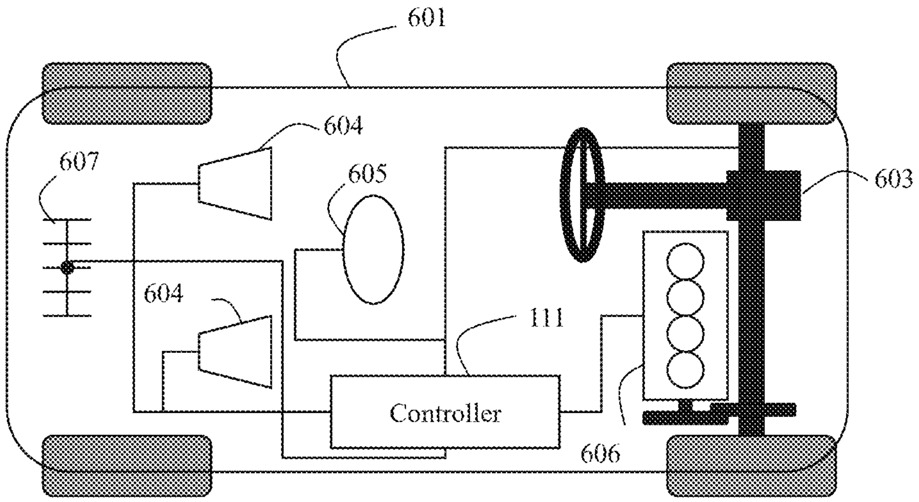
FIG. 6A shows a schematic of a vehicle including the controller for controlling the vehicle, according to some embodiments of the present disclosure.

FIG. 6A shows a schematic of a vehicle 601 including the controller 111, according to some embodiments of the present disclosure. As used herein, the vehicle 601 is an autonomous vehicle and can be any type of wheeled vehicle, such as a passenger car, bus, or rover. Some embodiments control the motion of the vehicle 601. Examples of the motion include lateral motion of the vehicle 601 controlled by a steering system 603 of the vehicle 601. In one embodiment, the steering system 603 is controlled by the controller 111.

The vehicle 601 can also include an engine 606, which can be controlled by the controller 111 or by other components of the vehicle 601. The vehicle can also include one or more sensors 604 to sense the surrounding environment. Examples of the sensors 604 include distance range finders, radars, lidars, and cameras. The vehicle 601 can also include one or more sensors 605 to sense its current motion quantities and internal status. Examples of the sensors 605 include global positioning system (GPS), accelerometers, inertial measurement units, gyroscopes, shaft rotational sensors, torque sensors, deflection sensors, pressure sensor, and flow sensors. The sensors provide information to the controller 111. The vehicle can be equipped with a transceiver 607 enabling communication capabilities of the controller 111 through wired or wireless communication channels.

Figure 6B:
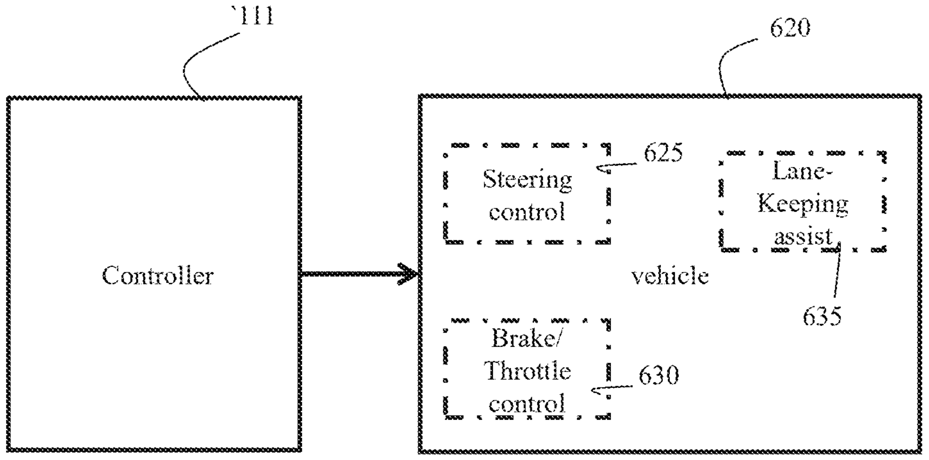
FIG. 6B shows a schematic of interaction between the controller and controllers of the vehicle, according to some embodiments of the present disclosure.

FIG. 6B shows a schematic of interaction between the controller 111 and controllers 620 of the vehicle 601, according to some embodiments. For example, in some embodiments, the controllers 620 of the vehicle 601 are steering controller 625 and brake/throttle controllers 630 that control rotation and acceleration of the vehicle 601. In such a case, the controller 111 outputs control commands to the controllers 625 and 630 to control a state of the vehicle 601 such as acceleration, orientation, and the like, for controlling motion of the vehicle 601. The controllers 620 can also include high-level controllers, e.g., a lane-keeping assist controller 635 that further process the control commands of the controller 111. In both cases, the controllers 620 use the control commands of the controller 111 to control at least one actuator of the vehicle 601, such as the steering wheel and/or the brakes of the vehicle 601, in order to control the motion of the vehicle 601.

Figure 6C:
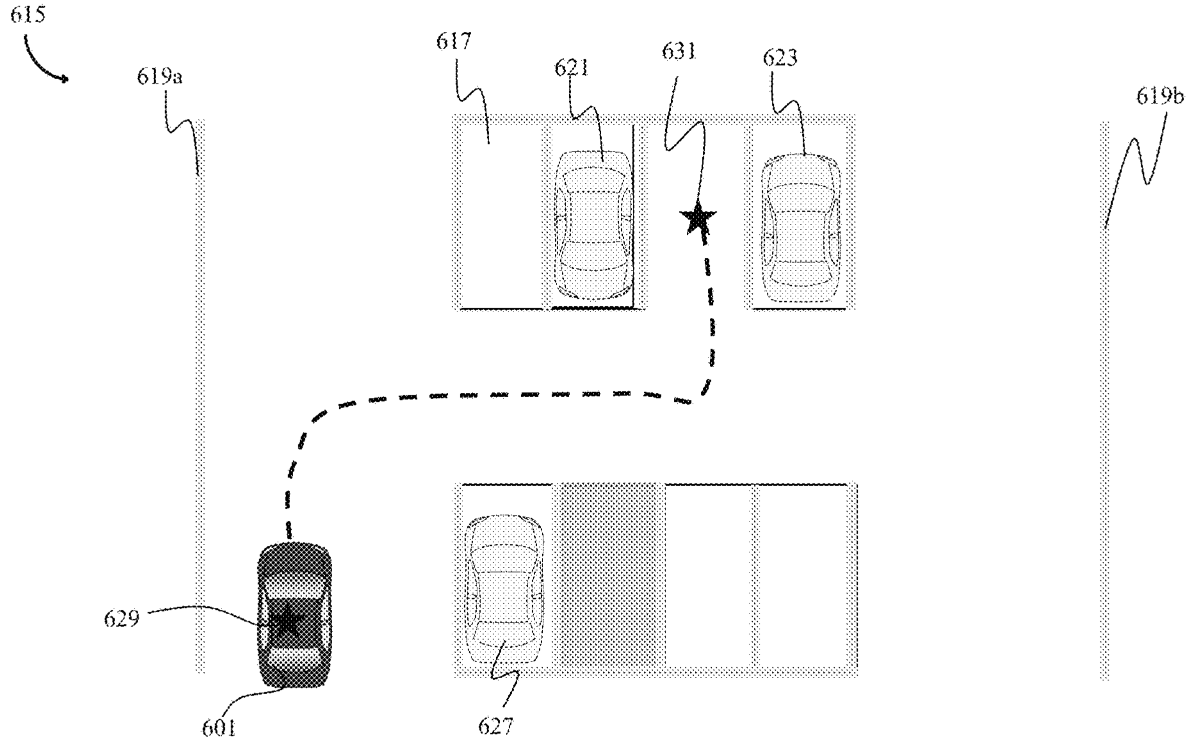
FIG. 6C illustrates parking of the vehicle in a parking space, according to an embodiment of the present disclosure.

FIG. 6C illustrates parking of the vehicle 601 in a parking space 615, according to an embodiment of the present disclosure. The parking space 615 includes parking spots, such as a spot 617, for parking vehicles. The parking space 615 is bounded by boundaries 619*a* and 619*b*. The parking space 615 further includes parked vehicles 621, 623, and 627. The vehicle 401 is at a starting point 629 and needs to be parked at a target parking spot 631. According to some embodiments, the controller 111 controls the vehicle 601 to navigate the vehicle 601 to the target parking spot 631. At first, the controller 111 receives an image of the vehicle 601 operating in the parking space 615, from a camera (not shown in figure) installed in the parking space 615. Further, the controller 111 receives a target image including image coordinates corresponding to a first target key point and a second target key point on the vehicle 601. The first target key point and the second target key point on the vehicle 601 define the target parking spot 631. Based on the received image and the target image, the controller 111 computes the image coordinates of the key points on the vehicle 601 and subsequently a control law for the vehicle 601, as described above with reference FIG. 1C.

Further, the controller 111 generates control commands according to the control law to navigate the vehicle 601 to the target parking spot 631. The control commands include values of one or combination of a steering angle of wheels of the vehicle 601, a rotational velocity of vehicle wheels, and an acceleration of the vehicle 601. The controller 111 controls the vehicle 601 based on the control commands, causing the vehicle 601 to park at the target parking spot 631. In such a manner, the controller 111 controls the vehicle 601 to execute the task of parking at the target parking spot 631 in the parking space 615.

Figure 7:
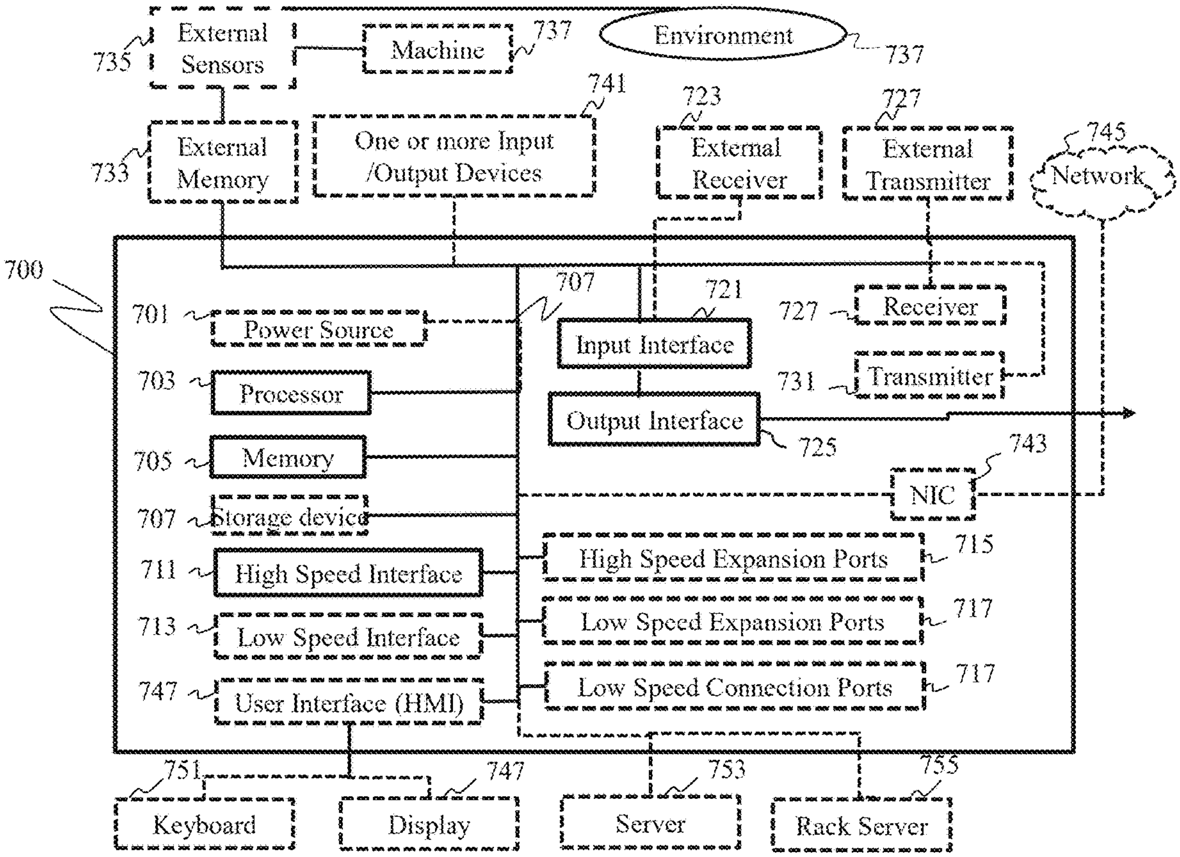
FIG. 7 is a schematic illustrating by non-limiting example a computing apparatus for implementing the methods and the systems of the present disclosure.

FIG. 7 is a schematic illustrating by non-limiting example a computing apparatus for implementing the methods and the systems of the present disclosure. The computing device 700 can include a power source 701, a processor 703, a memory 705, a storage device 707, all connected to a bus 709. Further, a high-speed interface 711, a low-speed interface 713, high-speed expansion ports 715 and low speed connection ports 717, can be connected to the bus 709. In addition, a low-speed expansion port 719 is in connection with the bus 709. Further, an input interface 721 can be connected via the bus 709 to an external receiver 723 and an output interface 725. A receiver 727 can be connected to an external transmitter 729 and a transmitter 731 via the bus 709. Also connected to the bus 709 can be an external memory 733, external sensors 735, machine(s) 737, and an environment 739. Further, one or more external input/output devices 741 can be connected to the bus 709. A network interface controller (NIC) 743 can be adapted to connect through the bus 709 to a network 745, wherein data or other data, among other things, can be rendered on a third-party display device, third party imaging device, and/or third-party printing device outside of the computer device 700.

The memory 705 can store instructions that are executable by the computer device 700, historical data, and any data that can be utilized by the methods and systems of the present disclosure. The memory 705 can include random access memory (RAM), read only memory (ROM), flash memory, or any other suitable memory systems. The memory 705 can be a volatile memory unit or units, and/or a non-volatile memory unit or units. The memory 705 may also be another form of computer-readable medium, such as a magnetic or optical disk.

The storage device 707 can be adapted to store supplementary data and/or software modules used by the computer device 700. For example, the storage device 707 can store historical data and other related data as mentioned above regarding the present disclosure. Additionally, or alternatively, the storage device 707 can store historical data like data as mentioned above regarding the present disclosure. The storage device 707 can include a hard drive, an optical drive, a thumb-drive, an array of drives, or any combinations thereof. Further, the storage device 707 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 703), perform one or more methods, such as those described above.

The computing device 700 can be linked through the bus 709, optionally, to a display interface or user Interface (HMI) 747 adapted to connect the computing device 700 to a display device 749 and a keyboard 751, wherein the display device 749 can include a computer monitor, camera, television, projector, or mobile device, among others. In some implementations, the computer device 700 may include a printer interface to connect to a printing device, wherein the printing device can include a liquid inkjet printer, solid ink printer, large-scale commercial printer, thermal printer, UV printer, or dye-sublimation printer, among others.

The high-speed interface 711 manages bandwidth-intensive operations for the computing device 700, while the low-speed interface 713 manages lower bandwidth-intensive operations. Such allocation of functions is an example only. In some implementations, the high-speed interface 711 can be coupled to the memory 705, the user interface (HMI) 747, and to the keyboard 751 and the display 749 (e.g., through a graphics processor or accelerator), and to the high-speed expansion ports 715, which may accept various expansion cards via the bus 709. In an implementation, the low-speed interface 713 is coupled to the storage device 707 and the low-speed expansion ports 717, via the bus 709. The low-speed expansion ports 717, which may include various communication ports (e.g., USB, Bluetooth, Ethernet, wireless Ethernet) may be coupled to the one or more input/output devices 741. The computing device 700 may be connected to a server 753 and a rack server 755. The computing device 700 may be implemented in several different forms. For example, the computing device 700 may be implemented as part of the rack server 755.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A controller for controlling a robot to execute a task of reaching a target state in an environment, comprising:
- a memory configured to store a transition dynamics model that models dynamics of the robot with respect to image coordinates of a first key point and a second key point on the robot, wherein the image coordinates of the first key point and the second key point on the robot define a state of the robot; and
- a processor configured to:
  - receive, from a camera, an image of the robot operating in the environment;
  - receive a target image including image coordinates corresponding to a first target key point and a second target key point on the robot, wherein the first target key point and the second target key point on the robot define the target state of the robot in the environment;
  - determine a homography matrix based on at least four visible points in the received image that are coplanar to the image coordinates of the first key point and the second key point;
  - reconstruct the image coordinates of the first key point and the second key point based on the homography matrix;
  - compute, based on the reconstructed image coordinates and the transition dynamics model, a control law that navigates the robot from the reconstructed image coordinates to the image coordinates corresponding to the first target key point and the second target key point; and
  - control the robot based on the control law to achieve the image coordinates corresponding to the first target key point and the second target key point to reach the target state of the robot.

2. The controller of claim 1, wherein the state of the robot defined by the first key point and the second key point includes a location and an orientation of the robot, and wherein the target state defined by the first target key point and the second target key point includes a target location and a target orientation of the robot in the environment.

3. The controller of claim 1, wherein one of the first key point and the second key point is a centroid of the robot and the other key point is located on the robot at a predetermined distance from the centroid of the robot.

4. The controller of claim 1, wherein processor is configured to reconstruct the image coordinates of the first key point and the second key point based on the homography matrix when one or both of the first key point and the second key point on the robot are occluded.

5. The controller of claim 1, wherein the camera is installed at a location in the environment, and wherein the camera is uncalibrated.

6. The controller of claim 1, wherein the processor is further configured to determine the homography matrix using an outlier rejection algorithm.

7. The controller of claim 1, wherein the processor is further configured to derive a sequential feedback controller based on a differential dynamic programming (DDP) algorithm and the dynamics of the robot with respect to the image coordinates of the first key point and the second key point modeled by the transition dynamics model.

8. The controller of claim 7, wherein the sequential feedback controller is configured to compute the control law as a proportional feedback law based on a difference between the reconstructed image coordinates and the image coordinates corresponding to the first target key point and the second target key point.

9. The controller of claim 1, wherein motion of the robot is subject to a nonholonomic constraint, and wherein the nonholonomic constraint represents the robot's inability to move in a direction perpendicular to a current heading of the robot.

10. The controller of claim 9, wherein the processor is further configured to determine a complicated trajectory for the robot subject to the nonholonomic constraint by solving a planning problem, wherein traversing the complicated trajectory temporarily increases a feedback error before bringing the feedback error to zero at the target state.

11. The controller of claim 1, wherein the transition dynamics model is trained offline based on image coordinates of the first key point and the second key point in each training image, using a machine learning method.

12. The controller of claim 1, wherein the robot is a warehouse mobile robot and the task includes transporting an object to a target location in a warehouse.

13. The controller of claim 1, wherein the robot is an autonomous vehicle and the task includes reaching a target parking spot in a parking space.

14. A method for controlling a robot to execute a task of reaching a target state in an environment, the method uses a memory configured to store a transition dynamics model that models dynamics of the robot with respect to image coordinates of a first key point and a second key point on the robot, wherein the image coordinates of the first key point and the second key point on the robot define a state of the robot, the method comprising:
- receiving, from a camera, an image of the robot operating in the environment;
- receiving a target image including image coordinates corresponding to a first target key point and a second target key point on the robot, wherein the first target key point and the second target key point on the robot define the target state of the robot in the environment;
- determining a homography matrix based on at least four visible points in the received image that are coplanar to the image coordinates of the first key point and the second key point;
- reconstructing the image coordinates of the first key point and the second key point based on the homography matrix;
- computing, based on the reconstructed image coordinates and the transition dynamics model, a control law that navigates the robot from the reconstructed image coordinates to the image coordinates corresponding to the first target key point and the second target key point; and
- controlling the robot based on the control law to achieve the image coordinates corresponding to the first target key point and the second target key point to reach the target state of the robot.

15. The method of claim 14, wherein the state of the robot defined by the first key point and the second key point includes a location and an orientation of the robot, and wherein the target state defined by the first target key point and the second target key point includes a target location and a target orientation of the robot in the environment.

16. The method of claim 14, wherein one of the first key point and the second key point is a centroid of the robot and the other key point is located on the robot at a predetermined distance from the centroid of the robot.

17. The method of claim 14, wherein the method further comprises reconstructing the image coordinates of the first key point and the second key point based on the homography matrix when one or both of the first key point and the second key point on the robot are occluded.

18. The method of claim 14, wherein the camera is installed at a location in the environment, and wherein the camera is uncalibrated.

19. The method of claim 14, wherein the method further comprises determining the homography matrix using an outlier rejection algorithm.

20. A non-transitory computer-readable storage medium embodied thereon a program executable by a processor for performing a method for controlling a robot to execute a task of reaching a target state in an environment, the storage medium stores a transition dynamics model that models dynamics of the robot with respect to image coordinates of a first key point and a second key point on the robot, wherein the image coordinates of the first key point and the second key point on the robot define a state of the robot, the method comprising:

receiving, from a camera, an image of the robot operating in the environment;

receiving a target image including image coordinates corresponding to a first target key point and a second target key point on the robot, wherein the first target key point and the second target key point on the robot define the target state of the robot in the environment;

determining a homography matrix based on at least four visible points in the received image that are coplanar to the image coordinates of the first key point and the second key point;

reconstructing the image coordinates of the first key point and the second key point based on the homography matrix;

computing, based on the reconstructed image coordinates and the transition dynamics model, a control law that navigates the robot from the reconstructed image coordinates to the image coordinates corresponding to the first target key point and the second target key point; and controlling the robot based on the control law to achieve the image coordinates corresponding to the first target key point and the second target key point to reach the target state of the robot.

* * * * *